United States Patent
Wang

(10) Patent No.: US 9,854,300 B2
(45) Date of Patent: Dec. 26, 2017

(54) AUTOMATIC CHANNEL CHANGING AUXILIARY DEVICE AND AUTOMATIC CHANNEL CHANGING METHOD THEREOF

(71) Applicant: MStar Semiconductor, Inc., Hsinchu Hsien (TW)

(72) Inventor: Sung-Wen Wang, Zhubei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 0 days.

(21) Appl. No.: 15/014,257

(22) Filed: Feb. 3, 2016

(65) Prior Publication Data
US 2017/0195712 A1  Jul. 6, 2017

(30) Foreign Application Priority Data
Jan. 5, 2016  (TW) .............................. 105100118 A

(51) Int. Cl.
| | |
|---|---|
| H04N 21/442 | (2011.01) |
| H04N 21/438 | (2011.01) |
| H04N 21/466 | (2011.01) |
| H04N 21/482 | (2011.01) |
| H04N 21/84 | (2011.01) |
| H04N 21/41 | (2011.01) |
| H04N 21/434 | (2011.01) |
| H04N 21/8547 | (2011.01) |
| H04N 21/658 | (2011.01) |

(52) U.S. Cl.
CPC ..... *H04N 21/4383* (2013.01); *H04N 21/4104* (2013.01); *H04N 21/4345* (2013.01); *H04N 21/4668* (2013.01); *H04N 21/4826* (2013.01); *H04N 21/6581* (2013.01); *H04N 21/84* (2013.01); *H04N 21/8547* (2013.01)

(58) Field of Classification Search
None
See application file for complete search history.

(56) References Cited

U.S. PATENT DOCUMENTS

| | | | |
|---|---|---|---|
| 8,584,165 B1* | 11/2013 | Kane ................. | H04N 21/2225 |
| | | | 707/784 |
| 9,292,174 B1* | 3/2016 | Nijim .................... | G06F 3/0482 |
| 2006/0218577 A1* | 9/2006 | Goodman ............. | G06Q 30/02 |
| | | | 725/32 |
| 2011/0197237 A1* | 8/2011 | Turner ............... | H04N 21/2343 |
| | | | 725/78 |
| 2014/0214924 A1* | 7/2014 | Cha .................. | H04N 21/41407 |
| | | | 709/203 |
| 2016/0316245 A1* | 10/2016 | Hirsch ............... | H04N 21/2541 |

FOREIGN PATENT DOCUMENTS

| | | |
|---|---|---|
| TW | 201010424 A | 3/2010 |
| TW | 201524205 A | 6/2015 |

\* cited by examiner

*Primary Examiner* — Pankaj Kumar
*Assistant Examiner* — Charles N Hicks
(74) *Attorney, Agent, or Firm* — Edell, Shapiro & Finnan, LLC

(57) ABSTRACT

A device providing an automatic channel changing function includes: a receiving unit, receiving recommended program data, first user data and second user data from a first AV playing device; a storage unit, storing reference data; a look-up unit, generating channel changing data according to the recommended program data, the first user data, the second user data and the reference data; and a transmitting unit, transmitting the channel changing data to a second AV playing device according to the second user data.

10 Claims, 8 Drawing Sheets

AUTOMATIC CHANNEL CHANGING AUXILIARY DEVICE AND AUTOMATIC CHANNEL CHANGING METHOD THEREOF

This application claims the benefit of Taiwan application Serial No. 105100118, filed Jan. 5, 2016, the subject matter of which is incorporated herein by reference.

BACKGROUND OF THE INVENTION

Field of the Invention

The invention relates in general to an automatic channel changing auxiliary device and an automatic channel changing method, and more particularly to an automatic channel changing auxiliary device and an automatic channel changing method that generate channel changing data according to recommended program data.

Description of the Related Art

For a user who loves watching audiovisual (AV) programs, watching AV programs is an immense source of lifestyle entertainment and information. However, the fun of watching AV contents alone may no longer satisfy user needs. With the rising of social cultures, more and more users wish to share AV contents worth recommendation to friends and relatives. When a user wishes to recommend AV contents (e.g., a channel or program) to friends and relatives, according to prior art, by making a phone call or sending a message, the receiving party may be informed of the broadcasting information of the channel or program to be recommended through oral or text means. The receiving party then manually adjusts an AV hardware device to watch the AV contents recommended. Such unintuitive, time-consuming and tedious process significantly derogates the convenience and fun for users in recommending AV contents to one another.

SUMMARY OF THE INVENTION

An automatic channel changing auxiliary device is disclosed according to an embodiment of the present invention. The automatic channel changing auxiliary device includes a receiving unit, a storage unit, a look-up unit, and a transmitting unit. The receiving unit receives recommended program data, first user data and second user data from a first AV playing device. The storage unit stores reference data. The look-up unit generates channel changing data according to the recommended program data, the first user data, the second user data and the reference data. The transmitting unit transmits the channel changing data to a second AV playing device according to the second user data.

An automatic channel changing method for an automatic channel changing auxiliary device is disclosed according to another embodiment of the present invention. The channel changing auxiliary device includes a receiving unit, a storage unit, a look-up unit, and a transmitting unit. The storage unit stores reference data. The automatic channel changing method includes: receiving recommended program data, first user data and second user data from a first AV playing device by the receiving unit; generating channel changing information according to the program data, the first user data, the second user data and the reference data by the look-up unit; and transmitting the channel changing data to a second AV playing device according to the second user data by the transmitting unit.

The above and other aspects of the invention will become better understood with regard to the following detailed description of the preferred but non-limiting embodiments. The following description is made with reference to the accompanying drawings.

DETAILED DESCRIPTION OF THE INVENTION

With the progressing of technologies, television systems are divided into two main categories—broadcast television (BTV), and video-on-demand (VOD). In BTV, by broadcasting through radio waves or cables, television stations provide different programs at different timeslots on corresponding channels. A channel corresponding to each television station has a channel identity code. In VOD, content service providers provide multiple programs. Each of the programs has a program identity code, and may be provided to and watched by a user through streaming technologies according to user demands at any desired time.

Figure 1:
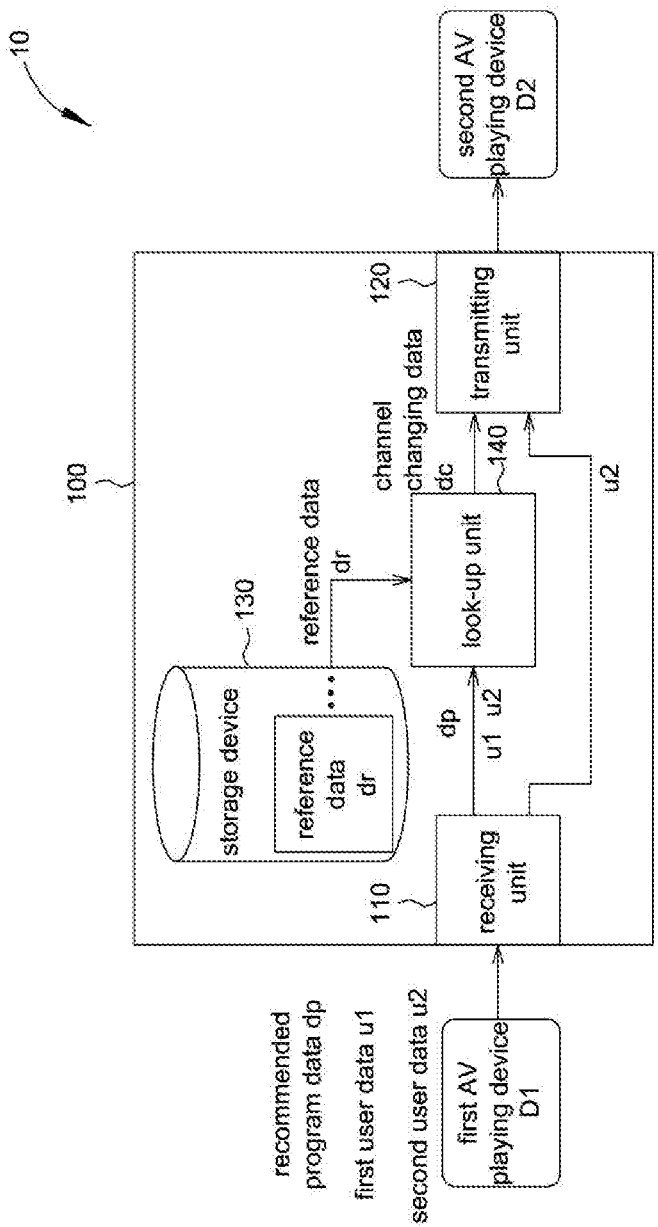
FIG. 1 is a structural schematic diagram of an automatic channel changing system according to an embodiment of the present invention.

FIG. 1 shows a structural schematic diagram of an automatic channel changing system 10 according to an embodiment of the present invention. The automatic channel changing system 10 includes a first AV playing device D1, a second AV playing device D2 and an automatic channel changing auxiliary device 100. As shown in FIG. 1, the automatic channel changing auxiliary device 100 includes a receiving unit 110, a storage unit 130, a look-up unit 140 and a transmitting unit 120. The receiving unit 110 receives recommended program data dp, first user information u1 and second user information u2 from the first AV playing device D1. The storage unit 130 stores reference data dr. The look-up unit 140 generates channel changing information dc according to the recommended program data dr, the first user data u1, the second user data u2 and the reference data dr. The transmitting unit 130 transmits the channel changing data dc to the second AV playing device D2 according to the second user data u2.

The first AV playing device D1 and the second AV playing device D2 may be connected to the automatic channel changing auxiliary device 100 through wired and/or wireless communication paths. The automatic channel changing auxiliary device 100 may include required hardware, software and/or firmware to realize the functions of the receiving unit 110, the storage unit 130, the look-up unit 140 and the transmitting unit 120. The automatic channel changing auxiliary device 100 may be disposed on a communication path between the first AV playing device D1 and the second AV playing device D2, e.g., disposed in an engine room, or disposed at a gateway device, router device, switching device, satellite device and/or signal processing device between the first AV playing device D1 and the second AV playing device D2. Alternatively, the automatic channel changing auxiliary device 100 may be disposed in the first AV playing device D1 and/or the second AV playing device D2.

The first AV playing device D1 may be a device used by a first user, and the second AV playing device D2 may be a device used by a second user. For example, each of the first AV playing device D1 and the second AV playing device D2 is a television, a computer, a tablet computer, a cell phone, or an AV multimedia device connectable to the automatic channel changing auxiliary device 100. The first user may be a recommender, and the second user may be a referral, i.e., the first user may recommend a program to the second user. For example, when the first AV playing device D1 and the second AV playing device D2 are both televisions, the first AV playing device D1 may send the recommended program data dp, the first user data u1 and the second user data u2 to an engine room provided with the automatic channel changing auxiliary device 100 through cables of a cable television network. For example, the automatic channel changing auxiliary device 100 may be a server. The automatic channel changing auxiliary device 100 may generate the channel changing data dc, send the channel changing data dc through cables and optical fiber cables to a modem, and send the channel changing data dc to the second AV playing device D2 through a WiFi wireless path. It should be noted that, the above scenario is an example for illustrating one of scenarios of wired paths and/or wireless paths between the first AV playing device D1 and the second AV playing device D2, and is not to be construed as a limitation to the scope of the present invention. According to an embodiment, the first AV playing device D1 and the second AV playing device D2 may register for accounts in advance and log into the system, so as to allow the automatic channel changing auxiliary device 100 to establish a procedure for connecting the registered accounts at the two ends according to the registered data, e.g., combining with existing accounts of a social network (e.g., Facebook® and Twitter®) or a network service provider (e.g., Google®), to expand user groups.

Referring to FIG. 1, taking an actual scenario for example, assuming a first user (a mother living in Taipei) watching a program (e.g., the television series "House of Cards", Season 1, Episode 1) wishes to recommend the program to a second user (e.g., a daughter living in Tokyo) corresponding to the second AV playing device D2 to watch the program together, the first user may operate a remote controller to designate the second user (e.g., the daughter) as the referral. Accordingly, the first AV playing device D1 may send the following to the receiving unit 110 of the automatic channel changing auxiliary device 100: a) the first user data u1 corresponding to the first AV playing device D1, b) the second user data u2 corresponding to the second AV playing device D2; and c) the recommended program data dp corresponding to the recommended program (e.g., the television series "House of Cards", Season 1, Episode 1). The look-up unit 140 of the automatic channel changing auxiliary device 100 may then generate the channel changing data dc according to the first user data u1, the second user data u2, the recommended program data dp and the reference data dr, and transmit the channel changing data dc to the second AV playing device D2. Thus, the second AV playing device D2 may change the channel or select the program according to the channel changing data dc to watch the recommend program (e.g., the television series "House of Cards", Season 1, Episode 1).

Figure 2:
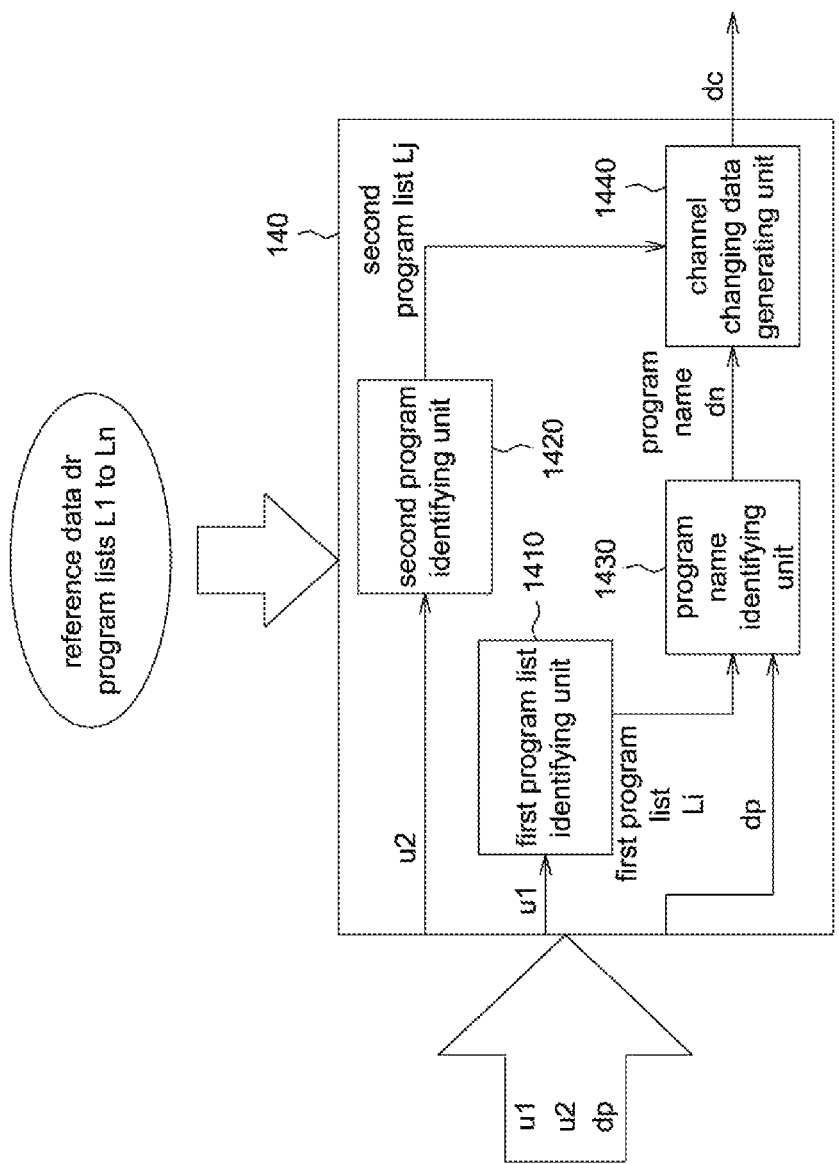
FIG. 2 is a structural schematic diagram of a look-up unit according to an embodiment of the present invention.

FIG. 2 shows a structural schematic diagram of the look-up table 140 according to an embodiment of the present invention. According to an embodiment of the present invention, the reference data dr may include a plurality of program lists L1 to Ln; the look-up unit 140 may include a first program list identifying unit 1410, a second program list identifying unit 1420, a program name identifying unit 1430, and a channel changing data generating unit 1440. The first program list identifying unit 1410 identifies a first program list Li from the plurality of program lists L1 to Ln according to the first user data u1. The second program list identifying unit 1410 identifies a second program list Lj from the plurality of program lists L1 to Ln according to the second user data u2. The program list identifying unit 1430 identifies a program name dn according to the recommended program data dp and the first program list Li. The channel changing data generating unit 1440 generates the channel changing data dc according to the program name dn and the second program list Lj. In continuation of the foregoing scenario, the first program list identifying unit 1410 receives the first user data u1 (corresponding to the recommender, e.g., the mother living in Taipei), and selects the first program list Li corresponding to the first AV playing device D1. As the recommended program data dp records the recommended program (e.g., the television series "House of Cards", Season 1, Episode 1), the program name identifying unit 1430 is able to identify the corresponding program name dn from the first program list Li. Similarly, the second program list identifying unit 1420 receives the second user data u2 (corresponding to the referral, e.g., the daughter living in Tokyo), and selects the second program list Lj corresponding to the second AV playing device D2. If the recommended program is included in the second program list Lj, i.e., the second AV playing device D2 is permitted to watch the recommended program, the second program list Lj should include the program name dn. Thus, the channel changing information generating unit 1440 may look-up the program name dn from the second program list Lj to accordingly generate the channel changing data dc. Taking the automatic channel changing auxiliary device 100 for example, the automatic channel changing auxiliary device 100 may connect to databases of various channel providers and/or content service providers to consistently retrieve and update the program lists L1 to Ln from the databases and hence include the reference data dr in the program lists L1 to Ln.

Figure 3:
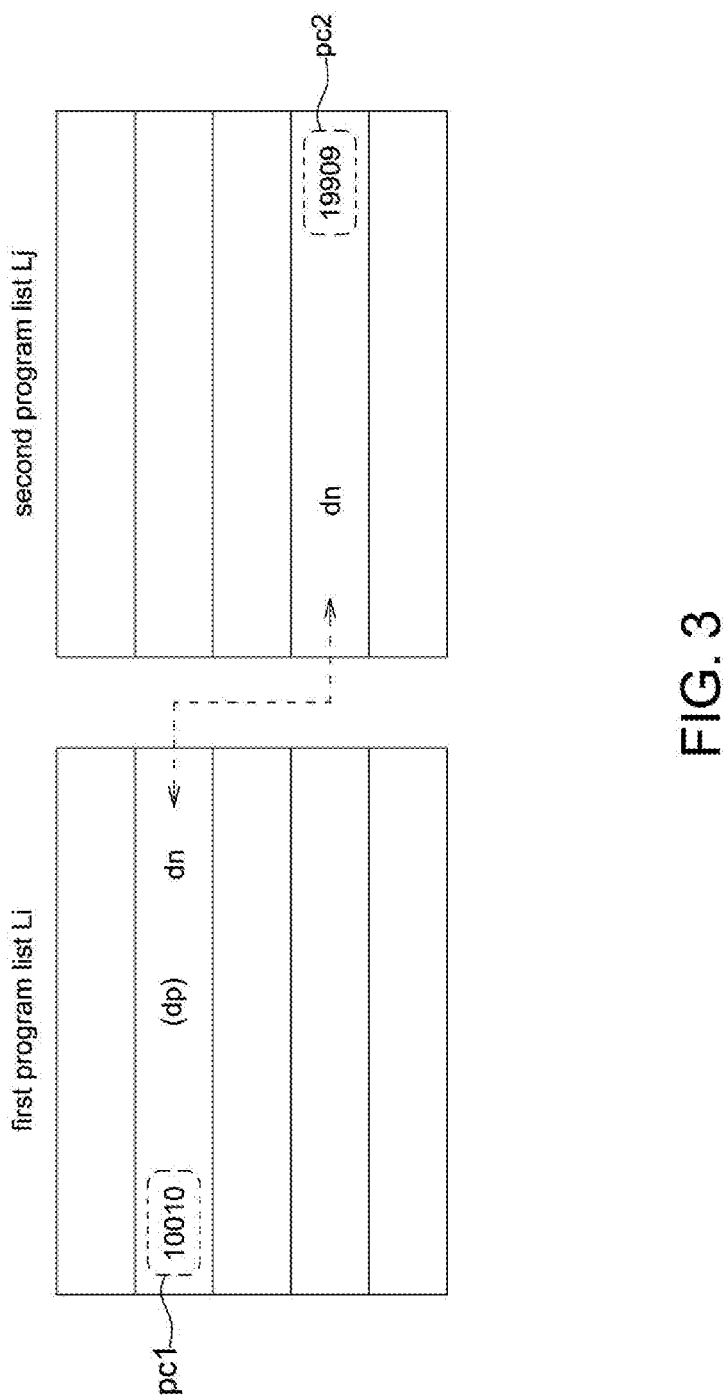
FIG. 3 is an operation schematic diagram corresponding to FIG. 2 according to an embodiment of the present invention.

FIG. 3 shows an operation schematic diagram corresponding to FIG. 2 according to an embodiment of the present invention. FIG. 3 may be used an example to illustrate operations of the embodiment in FIG. 2. In the first program list Li in FIG. 3, the recommended program data dp corresponding to the recommended program (e.g., the television series "House of Cards", Season 1, Episode 1) may include a program identity code pc1 (e.g., 10010) and corresponds to a program name dn. In the second program list Lj, the program name dn of the recommended program corresponds to a program identity code pc2 (e.g., 19909). Thus, the channel changing data dc may include the program identity code pc2 (e.g., 19909), such that the second AV playing device D2 may perform automatic channel changing or program selection according to the program identity code pc2 to allow the second user (the referral) to watch the recommended program. It should be noted that, the details of the program identity codes pc1 and pc2 (e.g., 10010 and 19909) as well as the first and second program lists Li and Lj are for illustration purposes only, and are not to be construed as limitations to the scope of the present invention. As previous described, current television systems include BTV and VOD, with users of a VOD system being allowed to a desired program according to a program identity code. Thus, the operations in FIG. 3 are applicable to a scenario where a recommender and a referral both use a VOD system.

Figure 4:
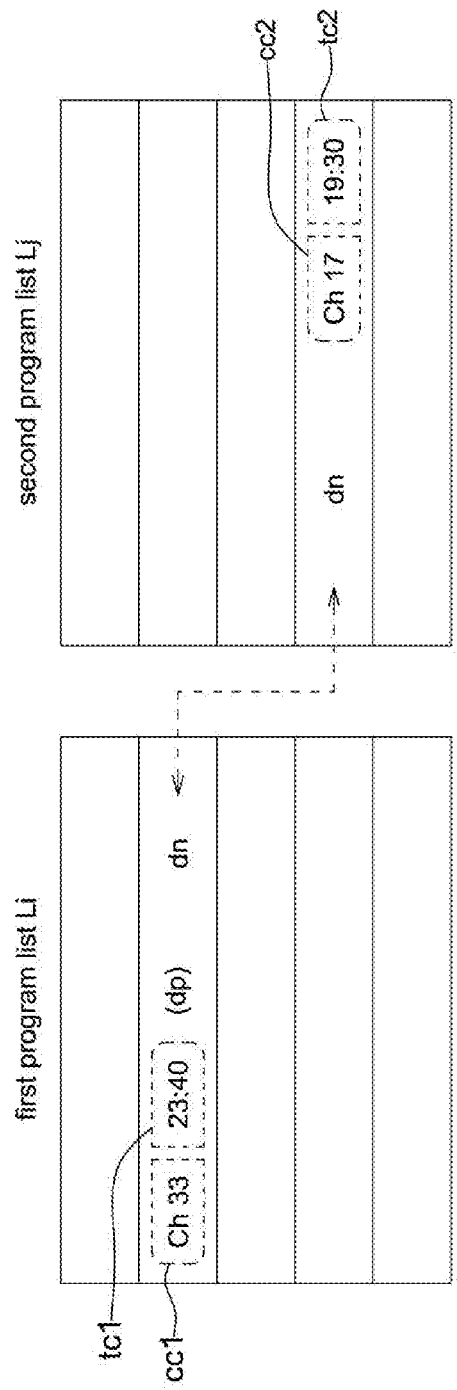
FIG. 4 is an operation schematic diagram corresponding to FIG. 2 according to another embodiment of the present invention.

FIG. 4 shows an operation schematic diagram corresponding to FIG. 2 according to another embodiment of the present invention. In the embodiment in FIG. 5, the recommended program data dp may include a channel identity code cc1 (e.g., Channel Ch33) and a timestamp tc1 (e.g., 23:40) to correspond to the program name dn (e.g., the television series "House of Cards", Season 1, Episode 1) in the first program list Li. According to the program name dn, a channel identity code cc2 (e.g., Channel Ch17) and a timestamp tc2 (e.g., 19:30) may be obtained from the second program list Lj corresponding to the referral end, such that the channel changing data dc includes the channel identity code cc2 and the timestamp tc2, and the second user (the referral) may then watch the recommended program through the second AV playing device D2. The embodiment in FIG. 4 is applicable to a scenario where a recommender and a referral both use a BTV system. The first AV playing device D1 and the second AV playing device D3 may be located in different regions and belong to different BTV systems, e.g., in Taipei and Tokyo, respectively, and so the same program may be broadcasted on different channels at different time points. Therefore, the embodiment in FIG. 4 is capable of recommending programs in a cross-system and cross-region manner.

Figure 5:
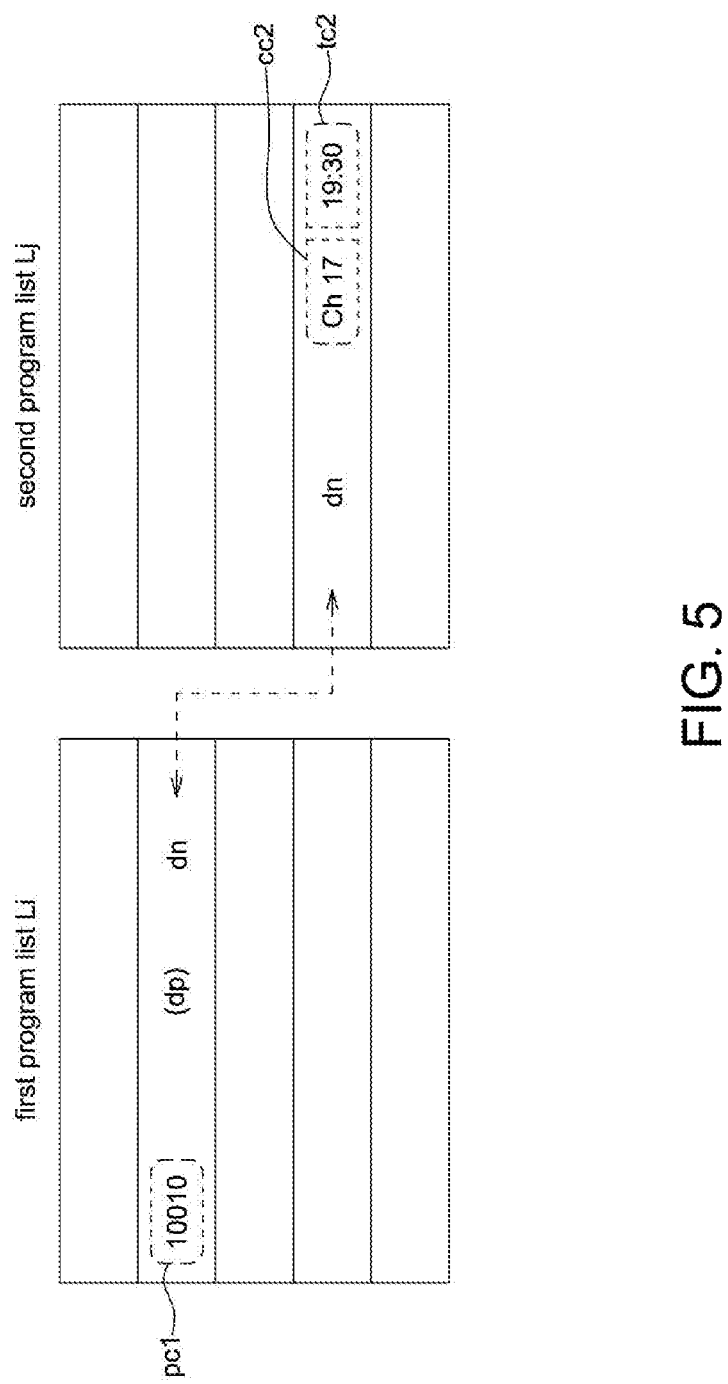
FIG. 5 is an operation schematic diagram corresponding to FIG. 2 according to another embodiment of the present invention.

FIG. 5 shows an operation schematic diagram corresponding to FIG. 2 according to another embodiment of the present invention. In the embodiment in FIG. 5, the first user (the recommender) may be a user of a VOD system, whereas the second user (the referral) may be a user of a BTV system. Thus, the recommended program data dp may include the program identity code pc1 (e.g., 10010), so as to obtain the program name dn from the first program list Li, and then to obtain from the second program list Lj that the program corresponding to the program name dn2 corresponds to the channel identity code cc2 (e.g., Channel Ch17) and the timestamp tc2 (e.g., 19:30). As such, the second user is allowed to watch a program recommended by friends and relatives on that channel at that time point.

Figure 6:
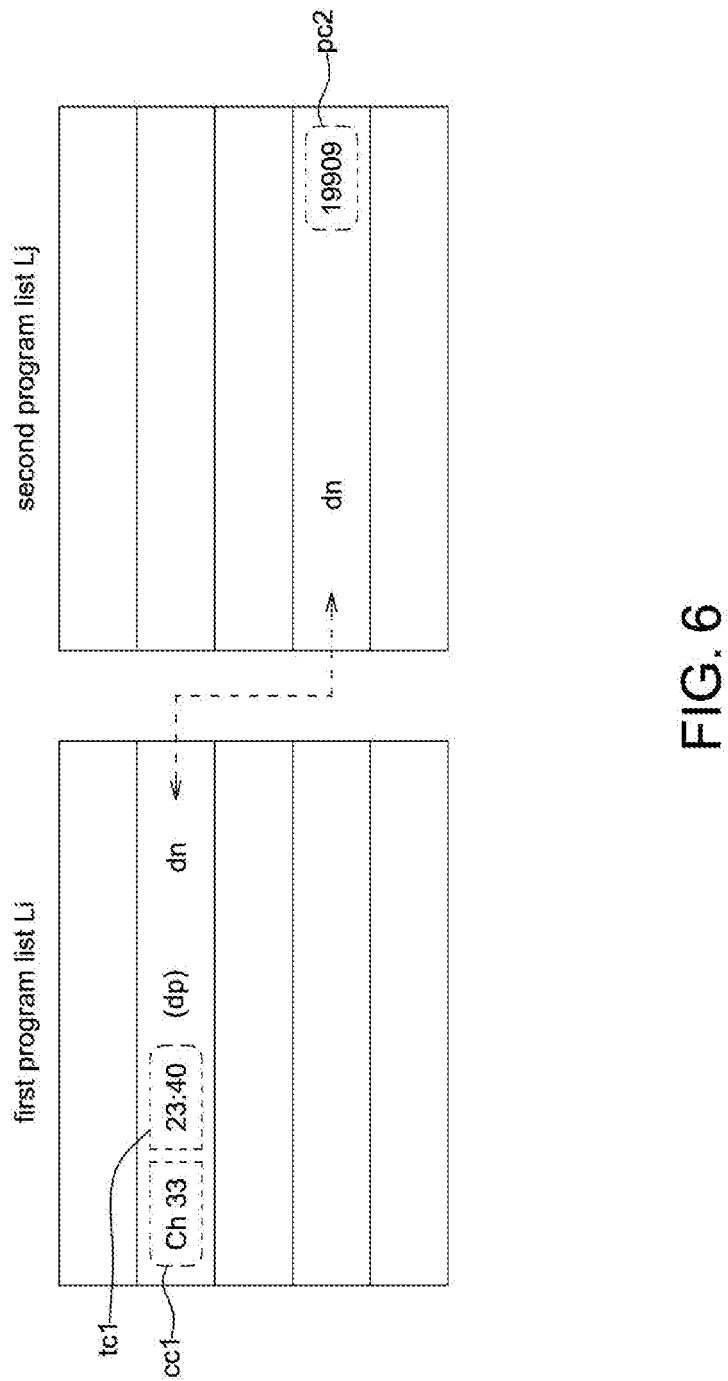
FIG. 6 is an operation schematic diagram corresponding to FIG. 2 according to another embodiment of the present invention.

FIG. 6 shows an operation schematic diagram corresponding to FIG. 2 according to yet another embodiment of the present invention. In FIG. 6, the first user (the recommender) corresponds to a BTV system, whereas the second user (the referral) corresponds to a VOD system. Thus, the recommended program data dp may include the channel identity code cc1 (e.g., Channel Ch33) and the timestamp tc1 (e.g., 23:40), so as to obtain the program name dn from the first program list Li, and then to obtain the program identity code pc2 (e.g., 19909) corresponding to the program name dn from the second program list Lj. Further, the channel changing data dc may include the program identity code pc2 to allow the second AV playing device D2 to perform automatic channel changing.

According to an embodiment of the present invention, the first user data u1 or the second user data u2 may include a user identity code, an electronic list identity code, television system category data, location data and/or content service provider (CSP) information, so as to allow the first program list identifying unit 1410 to correctly identify the first program list Li and the second program list identifying unit 1420 to correctly identify of the second program list Lj. For example, assuming the second user (the referral) is a user of the CSP Netflix, the second user data u2 may include the CSP information (corresponding to the identity code of Netflix) and the television system category data (corresponding to the identity code of the VOD system) as an index. Thus, the second program list identify unit 1420 may then look-up and obtain the program list provided by Netflix as the second program list Lj. For another example, assuming the first user (the recommender) is a user of the BTV NHK, the first user data u1 may include the television system category data (corresponding to the identity code of the BTV system), the CSP information (corresponding to the identity code of the NHK Japan Broadcasting Association) and location data (e.g., corresponding to a region identity code in Japan) as an index. Thus, the first program list identifying unit 1420 may look-up and obtain the program list of NHK as the first program list Li. It should be noted that, the above examples are for illustration purposes and are not to be construed as limitations to the present invention. According to an embodiment of the present invention, the first user data u1 and the second user data u2 may include more combinations of other types of information to serve as an index for the look-up unit 140 to obtain the corresponding first program list Li and second program list Lj.

Figure 7:
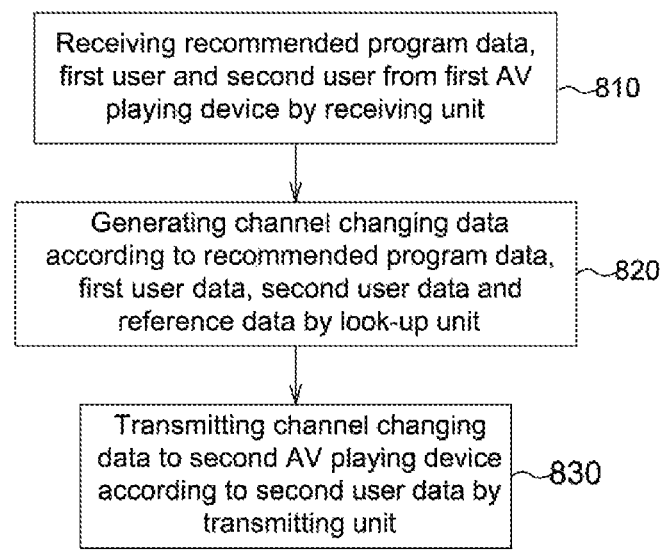
FIG. 7 is a flowchart of an automatic channel changing method according to an embodiment of the present invention.

FIG. 7 shows a flowchart of an automatic channel changing method 800 according to an embodiment of the present invention. The automatic channel changing method 800 may be applied with the automatic channel changing auxiliary device 100 in FIG. 1, and includes following steps.

In step 810, recommended program data, first user data and second user data are received from a first AV playing device by a receiving unit.

In step 820, channel changing data is generated according to the recommended program data, the first user data, the second user data and reference data by a look-up unit.

In step 830, the channel changing data is transmitted to a second AV playing device according to the second user data by a transmitting unit.

Figure 8:
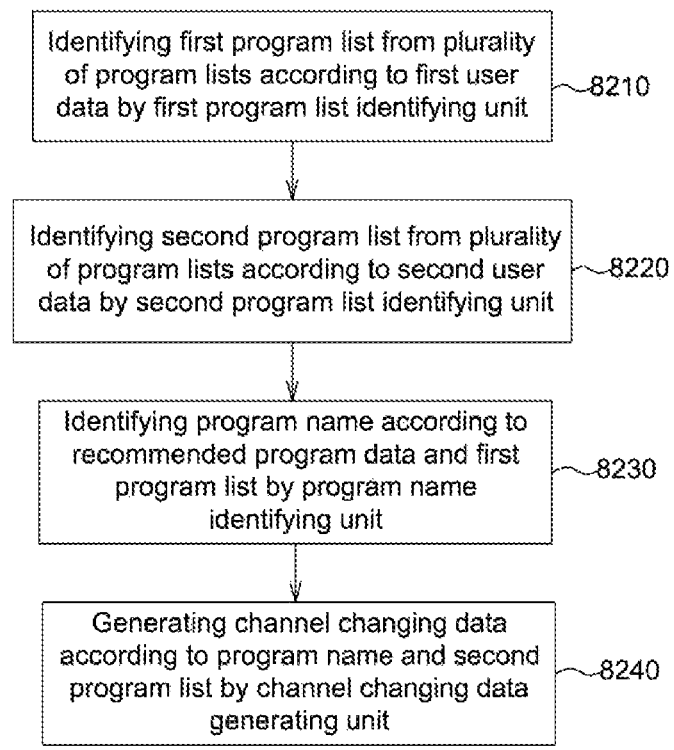
FIG. 8 is a flowchart of a look-up unit generating channel changing data according to an embodiment of the present invention.

FIG. 8 shows a flowchart of a look-up unit generating channel changing information according to an embodiment of the present invention. The process in FIG. 8 may be applied with reference to the embodiment in FIG. 2. Step 820 includes following steps.

In step 8210, a first program list is identified from a plurality of program lists according to the first user data by a first program list identifying unit.

In step 8220, a second program list is identified from the plurality of program lists according to the second user data by a second program list identifying unit.

In step 8230, a program name is identified according to the recommended program data and the first program list by a program name identifying unit.

In step 8240, the channel changing data is generated according to the program name and the second program list by a channel changing data generating unit.

As previously described, the second AV playing device D2 may perform automatic channel changing or program selection according to the channel changing data dc to allow the user (the referral) of the second AV playing device D2 to watch the program recommended by the user (the recommender) of the first AV playing device D1. The channel changing data dc may include a program identity code, a channel identity code and/or a timestamp.

In conclusion, the automatic channel changing auxiliary device and the associated application structure and process disclosed by the embodiments of the present invention are capable of significantly enhancing the convenience and fun for users in sharing AV contents in social groups, hence improving AV experiences of users. Further, by applying the present invention with creativity, those who work in various fields including broadcasting, cultural and non-profit organizations may also develop various marketing channels (e.g., being reimbursed with promotion coupons of sponsors by sharing video clips of charity fund-raising or cultural events). Further, related software/hardware providers may carry out development, research and manufacturing based on the present invention. Therefore, the present invention not only solves issues of the prior art, but also enhances user experiences and promotes development of the related field.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic channel changing auxiliary device, comprising:
   a receiving unit, receiving recommended program data, first user data and second user data from a first AV playing device when requested by the first AV playing device, wherein the recommended program data is of a program the first AV playing device suggests to a second AV playing device;
   a storage unit, storing reference data;
   a look-up unit, generating channel changing data according to the recommended program data, the first user data, the second user data and the reference data, wherein the first user data and the second user data correspond respectively to different users, and the channel changing data is of a program a first user suggests to a second user; and
   a transmitting unit, transmitting the channel changing data to the second AV playing device according to the second user data.

2. The automatic channel changing auxiliary device according to claim 1, wherein the reference data comprises a plurality of program lists, and the look-up unit is configured to:
   identify a first program list from the program lists according to the first user data;
   identify a second program list from the program lists according to the second user data;
   identify a program name according to the recommended program data and the first program list; and
   generate the channel changing data according to the program name and the second program list.

3. The automatic channel changing auxiliary device according to claim 2, wherein the first user data comprises at least one of a user identity code, an electronic list identity code, television system category data, location data and content service provider (CSP) information.

4. The automatic channel changing auxiliary device according to claim 2, wherein the recommended program data comprises a channel identity code and a timestamp.

5. The automatic channel changing auxiliary device according to claim 2, wherein the recommended program data comprises a program identity code.

6. The automatic channel changing auxiliary device according to claim 2, wherein the channel changing data comprises a channel identity code and a timestamp.

7. The automatic channel changing auxiliary device according to claim 2, wherein the channel changing data comprises a program identity code.

8. An automatic channel changing method, applied to an automatic channel changing auxiliary device comprising a receiving unit, a look-up unit, a storage unit and a transmitting unit, the storage unit storing reference data; the automatic channel changing method comprising:
   receiving, by the receiving unit, recommended program data, first user data and second user data from a first AV playing device when requested by the first AV playing device, wherein the recommended program data is of a program the first AV playing device suggests to a second AV playing device;
   generating channel changing data according to the recommended program data, the first user data, the second user data and the reference data by the look-up unit, wherein the first user data and the second user data correspond respectively to different users, and the channel changing data is of a program a first user suggests to a second user; and
   transmitting the channel changing data to the second AV playing device according to the second user data by the transmitting unit.

9. The automatic channel changing method according to claim 8, wherein the reference data comprises a plurality of program lists; the step of generating the channel changing data according to the recommended program data, the first user data, the second user data and the reference data by the look-up unit comprises:
   identifying a first program list from the program lists according to the first user data;
   identifying a second program list from the program lists according to the second user data;
   identifying a program name according to the recommended program data and the first program list; and
   generating the channel changing data according to the program name and the second program list.

10. The automatic channel changing method according to claim 8, wherein the first user data comprises at least one of a user identity code, an electronic list identity code, television system category data, location data and content service provider (CSP) information.

* * * * *